US006603824B1

(12) United States Patent
Cinkler et al.

(10) Patent No.: US 6,603,824 B1
(45) Date of Patent: Aug. 5, 2003

(54) METHOD FOR DEMODULATING A CARRIER WAVE MODULATED BY A DIGITAL SYMBOL SEQUENCE

(75) Inventors: Kalman Cinkler, Bremen (DE); Karl-Dirk Kammeyer, Buchholz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,066

(22) PCT Filed: Apr. 7, 1999

(86) PCT No.: PCT/DE99/01041

§ 371 (c)(1),
(2), (4) Date: Nov. 30, 2000

(87) PCT Pub. No.: WO99/53659

PCT Pub. Date: Oct. 21, 1999

(30) Foreign Application Priority Data

Apr. 8, 1998 (DE) .......................................... 198 15 701

(51) Int. Cl.⁷ .................... H04L 27/06; H04L 27/04; H04L 27/12; H04L 27/20; H03D 1/00
(52) U.S. Cl. .................. 375/340; 375/341; 375/295
(58) Field of Search ................. 375/340, 295, 375/341

(56) References Cited

U.S. PATENT DOCUMENTS

| | | | | |
|---|---|---|---|---|
| 5,263,033 A | * | 11/1993 | Seshadri | 714/792 |
| 5,629,958 A | * | 5/1997 | Willming | 375/295 |
| 5,636,251 A | * | 6/1997 | Citta et al. | 375/341 |
| 5,687,164 A | | 11/1997 | Takahashi et al. | |
| 5,825,832 A | * | 10/1998 | Benedetto | 375/341 |
| 6,108,517 A | * | 8/2000 | Arslan et al. | 455/21 |
| 6,396,254 B1 | * | 5/2002 | Feyh et al. | 324/76.19 |

FOREIGN PATENT DOCUMENTS

DE   36 28 993   3/1988
EP   0 524 756   1/1993

OTHER PUBLICATIONS

K.H. Tietgen, "Numerical Modulation Methods Applied in the FD/TDMA System S 900 D," Second Nordic Seminar on Digital Land Mobile Radio Communications, Stockholm, 1986.
D.E. Pfitzmann et al., "A New CP–4FSK Sampling Demodulator for the FD/TDMA System S 900 D, "Second Nordic Seminar on Digital Land Mobile Radio Communications, Stockholm, 1986.
Grossekatthoefer A.: "Detection Of Continuous–Phase Modulated (CPM) Signals With Artificial Neural Networks" Communications: The Key To Global propsperity. Globecom 1996, vol. 1, Nov. 18–22, 1996, pp. 185–190.
Feiz, S. et al., "Maximum–Likelihood Receiver For Four–Dimensional Signaling Schemes Corrupted By ISI", IEEE transactions On Communications, vol. 40, No. 1, Feb. 1, 1992, pp. 265–277.

* cited by examiner

*Primary Examiner*—Mohammad H. Ghayour
*Assistant Examiner*—Tony Al-Beshrawi
(74) *Attorney, Agent, or Firm*—Kenyon & Kenyon

(57) ABSTRACT

A method for demodulating a carrier wave that is modulated using a digital symbol sequence and that is transmitted over a noise-impacted channel, the ideal edge shapes of possible transitions between two symbols being known and stored in memory as reference edges, and a received edge being scanned and digitalized using a scanning frequency that is a multiple of the frequency of the symbol sequence. In particular, for detecting a received and scanned edge, all scanning values are used for calculating Euclidean distances from at least two reference edges, and the reference edge associated with the lowest Euclidean distance is selected. A Viterbi algorithm is applied to a sequence of estimated edges (rather than to an estimated symbol sequence) and the specific Euclidean distances between the edge received in one symbol period and the reference edges are considered as the costs of one trellis branch of the Viterbi algorithm.

6 Claims, 5 Drawing Sheets

| Sequence States | | |
|---|---|---|
| | having symbol: -1 | having symbol: 1 |
| from state: -1 | -1 | 1 |
| from state: 1 | -1 | 1 |

| Generated Edges | | |
|---|---|---|
| | having symbol: -1 | having symbol: 1 |
| from state: -1 | -1 → -1 | -1 → 1 |
| from state: 1 | 1 → -1 | 1 → 1 |

METHOD FOR DEMODULATING A CARRIER WAVE MODULATED BY A DIGITAL SYMBOL SEQUENCE

FIELD OF THE INVENTION

The present invention relates to a exemplary method for demodulating a carrier wave modulated using a digital symbol sequence and transmitted over a noise-impacted channel, the ideal edge shapes of possible transitions between two symbols being known and stored in memory (reference edges), and a received edge being scanned and digitalized using a scanning frequency which is a multiple of the frequency of the symbol sequence.

BACKGROUND INFORMATION

Continuous phase modulation (CPM) may be used to transmit (data) packets. In this context, by varying the phase angle (relation, position), a plurality of different symbols, e.g., four, can be transmitted. Since modulation using square-wave (rectangular) pulses all having the same symbol length may lead to a very broad spectrum, modulation may be carried out using pulses that extend over the length of two symbol periods and that are represented as cosine-shaped—to avoid steep edges. A modulation of this type is also known as 2RC-CPM.

The conference proceedings,

"K.-H. Tietgen, 'Numerical Modulation Methods Applied in the FD/TDMA System S 900 D,' Second Nordic Seminar on Digital Land Mobile Radio Communications, Stockholm, 1986,"

describe numerically modulating edges between two consecutive symbols, rather than to use the symbols themselves for modulation.

FIG. 1 shows the block diagram of a transmitter that is well-suited to use the known method. In this context, the system parts shaded in gray operate in the high system clock.

FIG. 2, for a four-value symbol alphabet, shows the conceivable edges in the transition from one specific symbol to the next in a symbol sequence to be transmitted. The idea in the known modulation methods is to describe the instantaneous frequency (i.e., the phase derived from time) of a (for example) four-step signal given a pulse shape of a length 2T as a side-by-side arrangement (consecutive alignment) of 16 possible edges $f_N(t)$ having length T. Instead of transmitting overlapping, shifted elementary pulses $\Sigma_I d(I) g(t-iT)$, is also possible to directly transmit a non-overlapping sequence of edges $\Sigma_I f_N(t-iT)$, neighboring symbols d(I) and d(I+1)T in each case deciding which of the 16 edges in interval $iT \leq t \leq (I+1)T$ is transmitted.

In the cited literature reference, a method of this type is termed CP-4FSK. To simplify the comparison with other methods, in what follows, it will be termed Num2RC 4st, derived from a four-step method, in which modulation takes place numerically and the edge shapes are based on the application of a "raised cosine" lasting for two symbols.

To receive a data sequence modulated in this way, a receiver has been proposed in the seminar report, "D. E. Pfitzmann and H.-P. Ketterling, 'A New CP-4FSK Sampling Demodulator for the FD/TDMA System S 900 D,'

Second Nordic Seminar on Digital Land Mobile Radio Communications, Stockholm, 1986."

The same receiver is also known from German Published Patent Application No. 36 28 993.

Using the receiver described above, a received edge is scanned and digitalized using a scanning frequency which is a multiple of the frequency of the symbol sequence. In the example cited, scanning is carried out between two symbols, for example, 16 times. The digitalized values are compared with each other and, in the event that the difference is small between two consecutive values, are combined into a symbol average (center). By averaging consecutive values it is attempted to eliminate the influence of noise.

Classical CPM receivers and demodulation methods are also termed "discriminator Integrate & Dump." Therefore, in what follows, when a signal edge shape of the "raised cosine" lasting for two symbol lengths is used, the term 2RCdsI&D is used. In the following, the term may be supplemented by the addition of "2st" (i.e., two-step, two symbols) or "4st" (i.e., four-step, four symbols).

In general, it is desirable for a receiver if each individual symbol is received in a highly reliable manner. In the classical CPM receiver method, it is necessary to filter the signal that has become noisy in passing through the real transition channel. Conventional filters operate as an integrator, for example, over two symbol periods, to average the noise. In the above-mentioned 2RC signal shapes, integration leads to intersymbol interference, abbreviated as ISI. To avoid intersymbol interference, a Viterbi algorithm may be applied to the received symbol sequence. Disadvantageous in this context is the great computing effort that places correspondingly great demands on the hardware.

SUMMARY OF THE INVENTION

Therefore, the exemplary embodiment according to the present invention is based on the objective of indicating a demodulation method in which it is possible to have small computing effort while maintaining the error rate at as close to the same level as possible. In this manner, the design effort for a receiver is simplified without relinquishing the advantages of "Continuous Phase Modulation" (CPM) such as low complexity and a compact spectrum, which may be important with respect to good bandwidth utilization.

The objective is believed to be achived through the exemplary embodiment according to the present invention in that, to detect a received and scanned edge, all of the scanning values are used, in each case, to calculate Euclidean distances from at least two reference edges, and the reference edge having the lowest Euclidean distance is selected.

In contrast to the cited classical receivers, in a demodulation method of this type, instead of the symbols to be estimated, the transition edges between the symbols are made central to the detection process. These edges are scanned multiple times and are compared with the original edges. Subsequently, the decision is made in favor of the edge whose distance, in the Euclidean sense, from the received edge is the smallest. This decision is carried out edge-by-edge independently of the neighboring edges, the decision hypothesis therefore not necessarily guaranteeing the continuity of the derivation of the phase of the CPM signal.

In another exemplary embodiment, there is a continuous phase.

Therefore, according to the exemplary embodiment according to the present invention, a viterbi algorithm may be applied to a number of consecutive edges, the respective Euclidean distances between the edges received in one symbol period and the reference edges being considered as the cost of a trellis branch of the Viterbi algorithm.

The properties of the CPM modulation thus make it possible to carry out an equalization of the data signals very efficiently.

The proposed maximum-likelihood estimation of the received data sequences using a Viterbi algorithm not on the symbol sequences but on the received edges has the consequence that a model can be used whose number of states is smaller by a factor of M in comparison to the classical equalizer. In this context, M designates the step-quantity of the signal. Therefore, the computing effort required can be kept small, as a result of which the hardware implementation becomes more attractive, as is described below.

The present invention is described in greater detail below on the basis of the drawing. The contents of the drawing are as follows:

DETAILED DESCRIPTION

Figure 1:
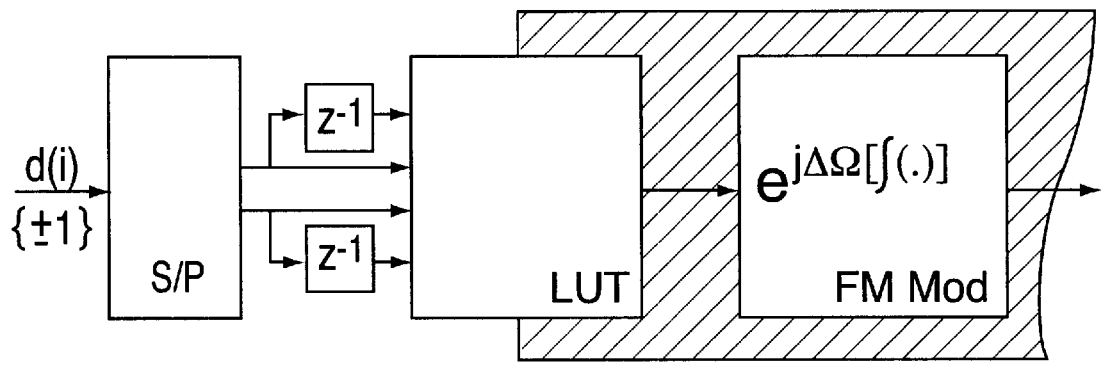
FIG. 1 shows the block diagram of a transmitter using numerical modulation of a digital symbol sequence on a carrier wave.
Figure 2:
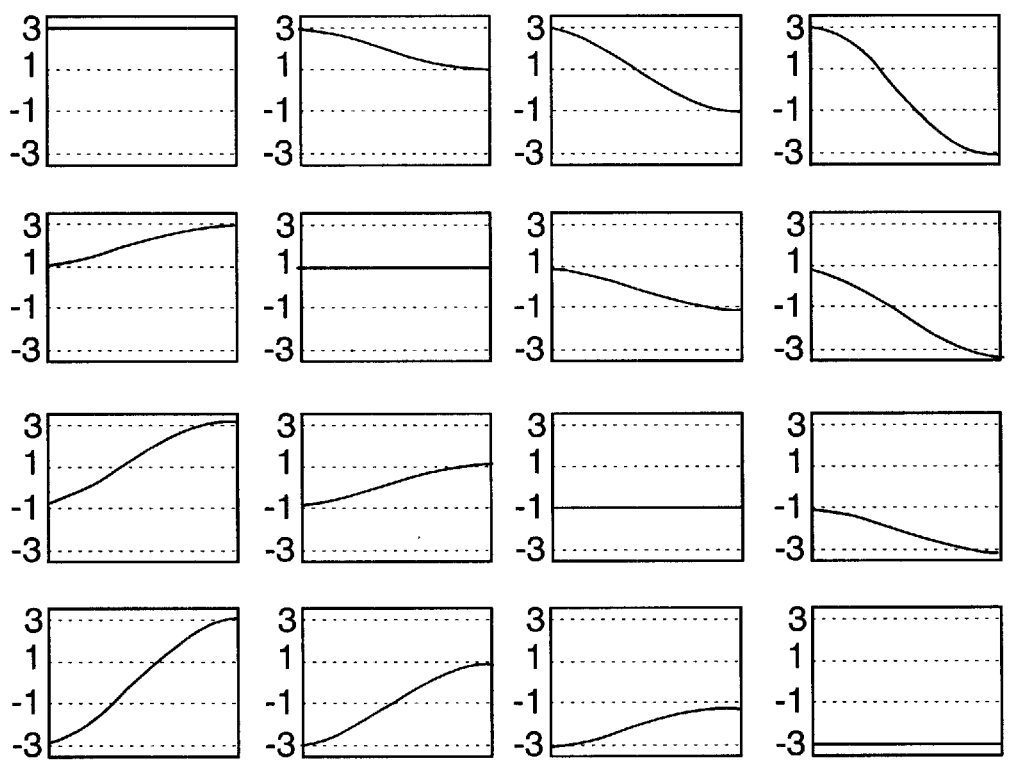
FIG. 2 shows a representation of the conceivable edges between two consecutive symbols, using a 2RC pulse and a four-step symbol alphabet (Num2RC 4st).

FIG. 1 shows a an available transmitter for the numerical modulation of a digital symbol sequence. The baseband model of the transmitter is composed of a serial-parallel transducer (converter) (S/P), a look-up table (LUT), in which essentially the contents of FIG. 2 are stored, and a baseband FM modulator.

The four-step signal is extracted from the input bit stream by combining, in each case, two bits. As a result of a delay of one symbol period, a total of four bits then address the LUT depicted in FIG. 1, containing the 16 symbol transitions $f_N(t)$ depicted in FIG. 2. The number of interpolation points (supporting values) can be freely determined, the number 16 being proposed in the related art cited in the specification. This number is a compromise, because although a high number of interpolation points is desirable to achieve good noise averaging, nevertheless a low number keeps the computing effort down. The parts of the transmitter that operate in the high system clock are shaded in gray.

Figures 3, 4:
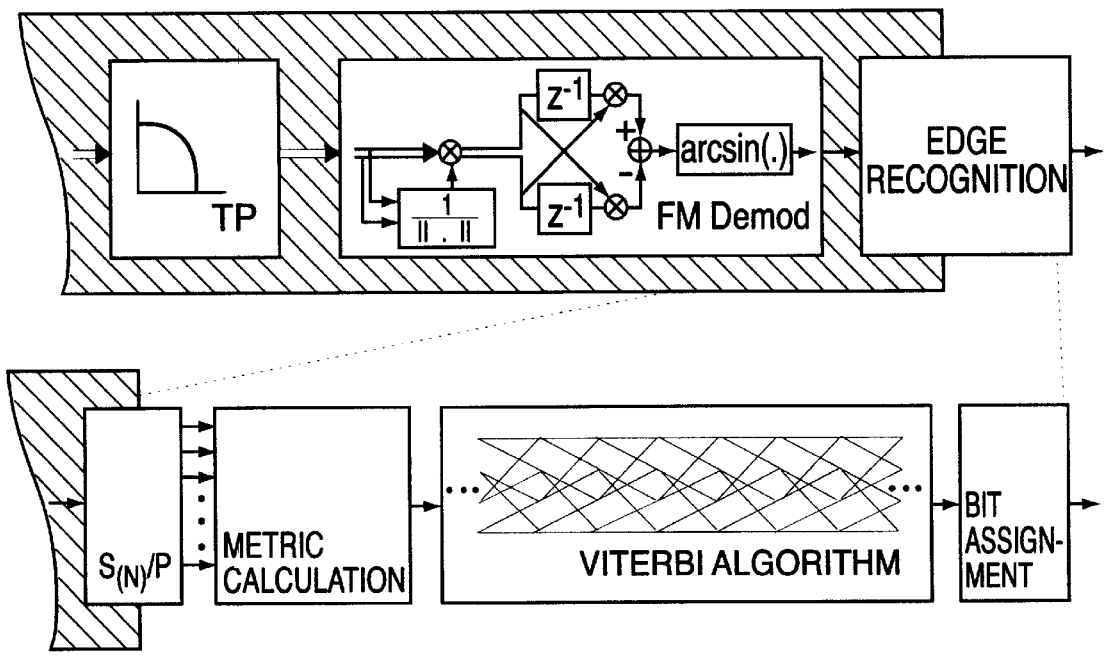
FIG. 3 shows a block diagram of a receiver according to an exemplary embodiment of the present invention.
FIG. 4 shows a table (with respect to FIG. 2) for a two-step modulation.

FIG. 3 shows the receiver according to an exemplary embodiment of the present invention.

The baseband model is composed of a band-limiting low pass TP, a baseband FM demodulator having parasite AM suppression, and edge detector (edge recognition), and a serial-parallel transducer (S/P). The parts of the receiver that operate in the high system clock are again shaded in gray.

According to an exemplary embodiment of present invention, in the edge detector, the determination of the edge that most likely corresponds to the transmitted edge is carried out in an edge-by-edge manner.

Figure 5:
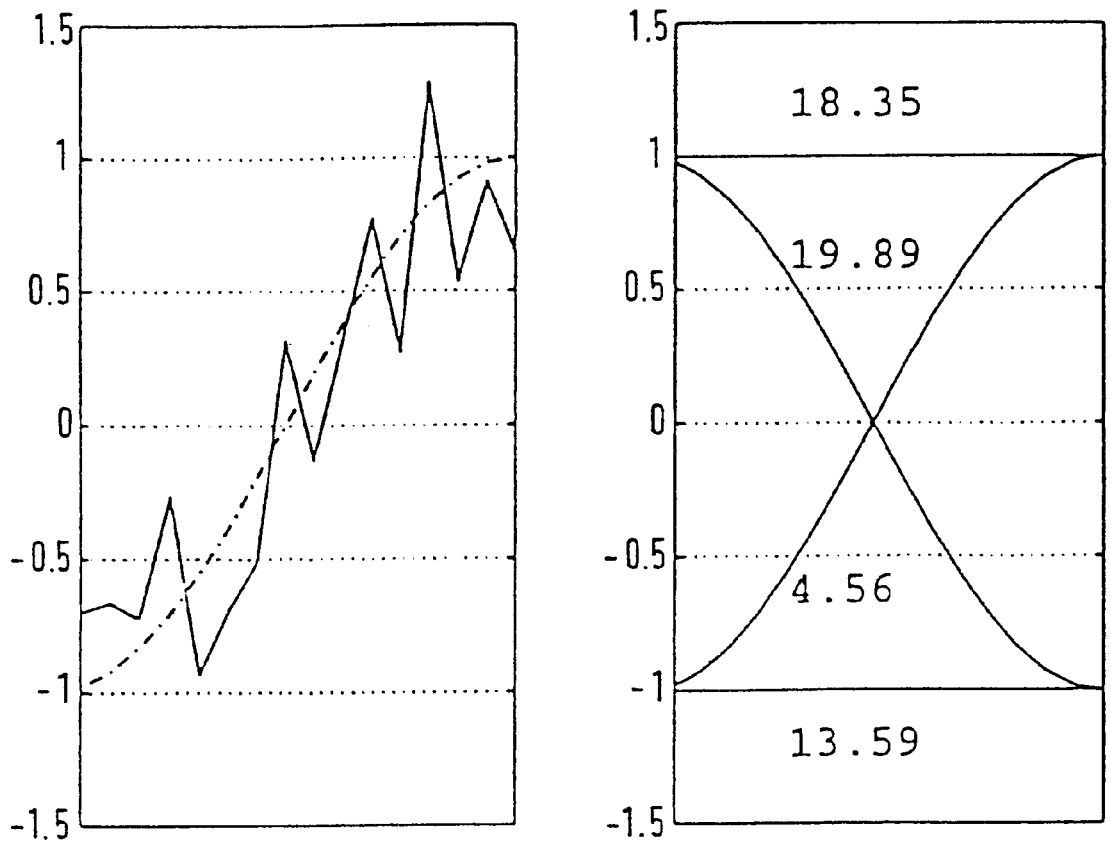
FIG. 5 shows a representation of a reference edge, an actually received edge, and a trellis segment having assigned costs.

FIG. 4 depicts, in the form of a table, the two-step case in conceivable edges, the two-step case being fundamental for the observation in FIG. 5. Expansion to the four-step case or that of an even higher-step proceeds by analogy with no limitation on generalizability.

FIG. 5, in the lefthand diagram, the solid line depicts a received, noisy edge, and the dot-dash line depicts one of the reference edges according to FIG. 4 (Num2RC 2st). The (exemplary) 16 values determined for each edge are used according to the exemplary embodiment of the present invention to calculate the sum of the quadratic differences (Euclidean difference). On the basis of the smallest Euclidean difference (right-hand side in FIG. 5), the reference edge is identified which most closely corresponds to the transmitted edge. Each individual detected edge determines two data symbols: the output symbol and the final symbol.

According to another exemplary embodiment of the present invention, provision is made to assure the continuity of the detected symbol transitions using a Maximum-Likelihood-Sequence estimator (i.e., using a Viterbi algorithm). Therefore, as is depicted in FIG. 5 on the right-hand side on the basis of a trellis segment, according to the exemplary embodiment of the present invention, the distances of the received edge from all valid reference edges are used as costs for the Viterbi algorithm. The Viterbi detector makes use of the following parameters: the trellis depth corresponds to step-quantity M of the signal (2RC pulse formation: memory of the length of one symbol period), the number of transitions is $M^2$. According to this, the path unification length should be chosen at $\geq 5$ symbols.

For the purpose of illustrating the processes, the following description is limited to the two-step case without restricting the generalizability.

The state transitions and the edges that are generated in the process are represented in the table according to FIG. 4. The calculation of the cumulative path costs is made to follow: in every current state, the path costs are calculated arising from the cost contributions of the branches of the trellis diagram leading to this state and their points of origin. The minimum is determined and is stored on the underlying branch. The cost contributions of the individual branches of a trellis segment are calculated—as was already explained—as distances of the current received and noisy edge from the corresponding edges determined by the model.

The distances of the received edge from the possible edges may be calculated as the sum of the quadratic distances (Euclidean distance). However, it is also conceivable to use the sum of the absolute distances or a different suitable calibration.

The calculation of the cost contributions of one edge is explained on the basis of a numerical example. FIG. 5 depicts a $-1 \rightarrow 1$ edge according to the table in FIG. 4, the edge being distorted as a consequence of interference. The distances from all possible reference edges are entered on the corresponding edges, and therefore the right half of the image represents the trellis segment that belongs to this received edge. The "distance" of the received edge is smallest from the $-1 \rightarrow 1$ edge, and therefore, in this trellis segment, this represents the most favorable branch.

After running through all of the trellis segments, the decision is made in the usual way in favor of one path in the trellis structure: the path having the minimal costs is selected, i.e., the path that is closest to the received edge sequence. The symbols are then derived from the selected path using the model. The difference from available Viterbi algorithms can be seen in the fact that here the Viterbi algorithm is applied not to a symbol sequence but to an edge sequence. As a result of the system-imminent redundancy, which is based on the fact that two neighboring edges have one symbol in common, the computing effort is significantly reduced. Although, when a classical Viterbi equalizer is used on symbol sequences, the ISI (intersymbol interference) may be eliminatable, nevertheless the memory length to be taken into account is increased to two symbol periods, which results in an M-fold increase in the number of states and, as a result, a drastic increase in the computing effort. In contrast thereto, the computing effort in the method according to the exemplary embodiment of present invention, i.e., the Num2RC receiver, is smaller by a factor of M.

In the four-step case, for example in the Num2RC demodulation according to the exemplary embodiment of present invention using Viterbi detection, only one quarter of the computing effort is necessary, in comparison to the classical CPM receiver method.

FIGS. 6 through 9 depict the advantages that are achieved by the exemplary method according to the present invention.

Figure 6:
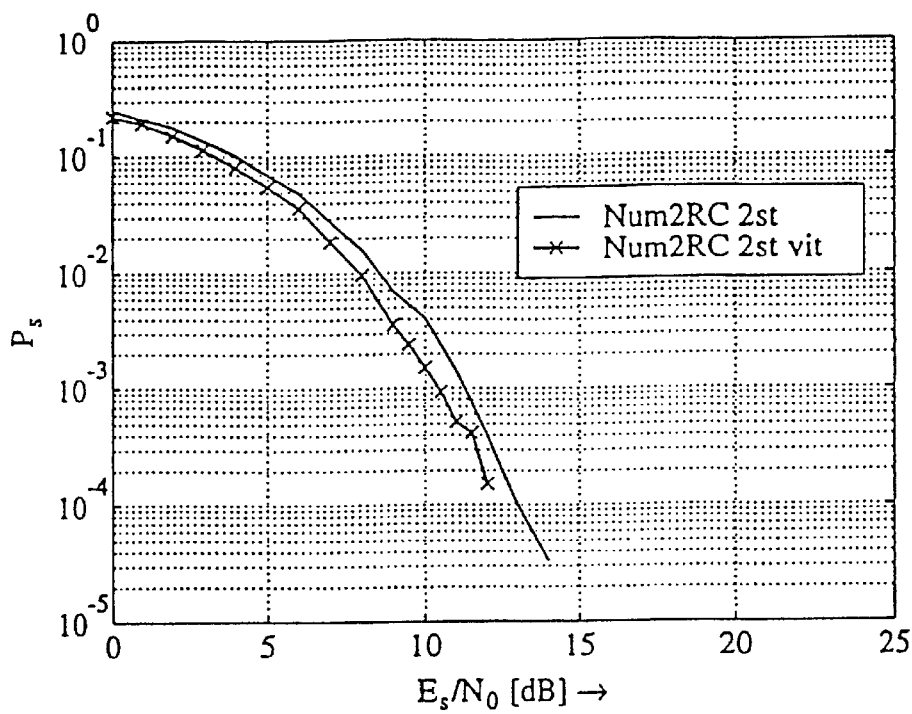
FIG. 6 shows an SER curve (Symbol Error Rate) for the two-step Num2RC, with and without Viterbi detection.

FIG. 6 depicts a comparison of the exemplary demodulation method according to the present invention (Num2RC 2st) with the same method having the additional application of a Viterbi algorithm on edge sequences according to FIG. 5 (Num2RC 2st vit).

Figure 7:
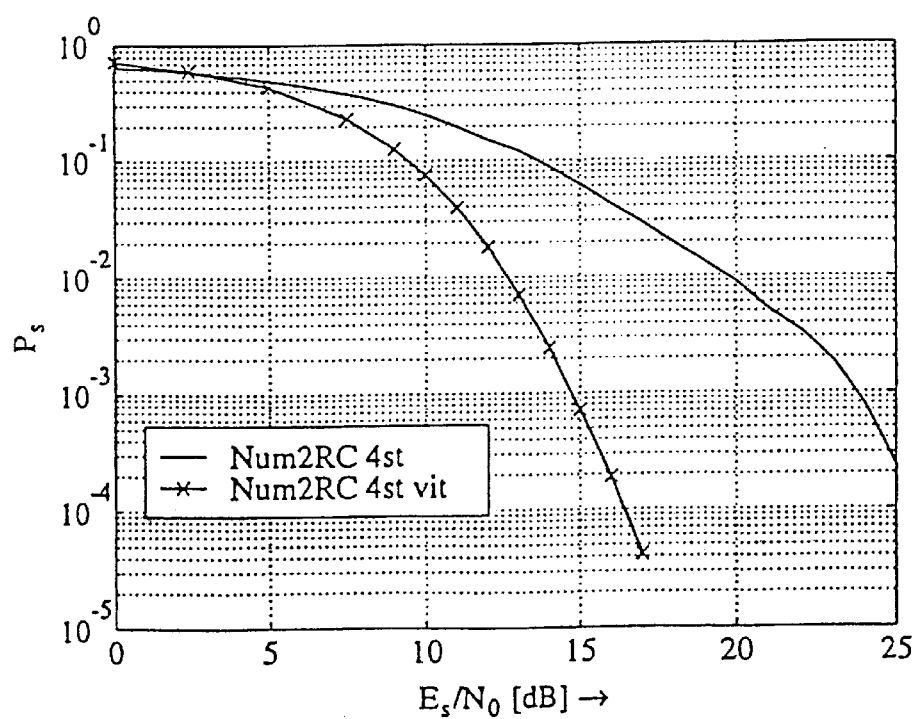
FIG. 7 shows a comparison according to FIG. 6 for the four-step Num2RC, with and without Viterbi detection.

FIG. 7 depicts an analogous comparison for the four-step case. On the vertical axis, the error rate is indicated (SER, Symbol Error Rate).

The comparison of FIG. 6 and FIG. 7 indicates that already in the four-step case, a significant reduction of the error rate can be observed.

Figure 8:
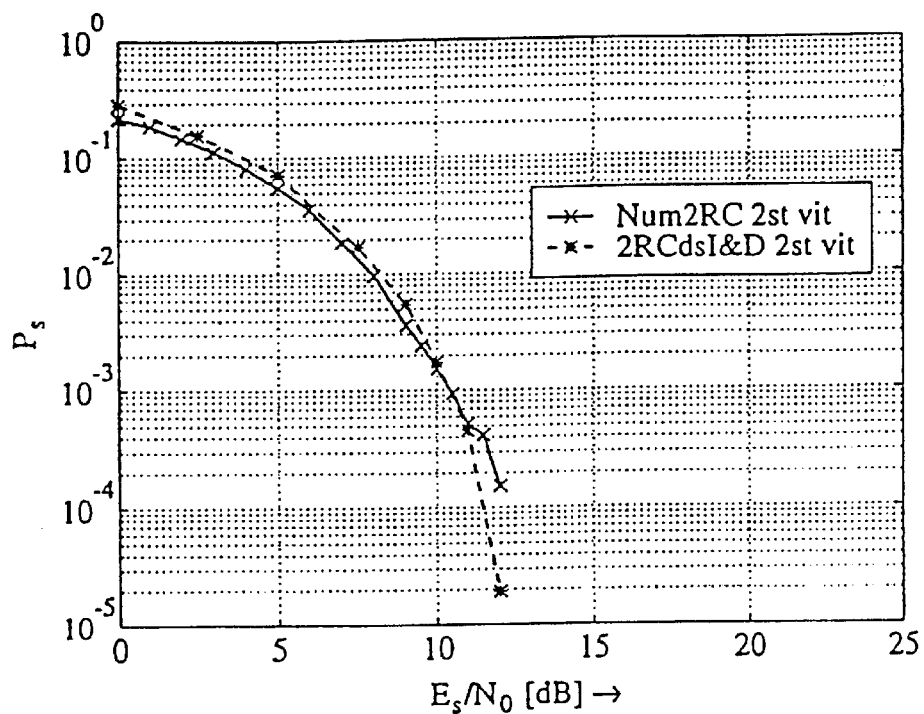
FIG. 8 shows a comparison for the two-step case of the exemplary method according to the present invention having Viterbi detection of the edges and a classical CPM demodulation method (Integrate & Dump).
Figure 9:
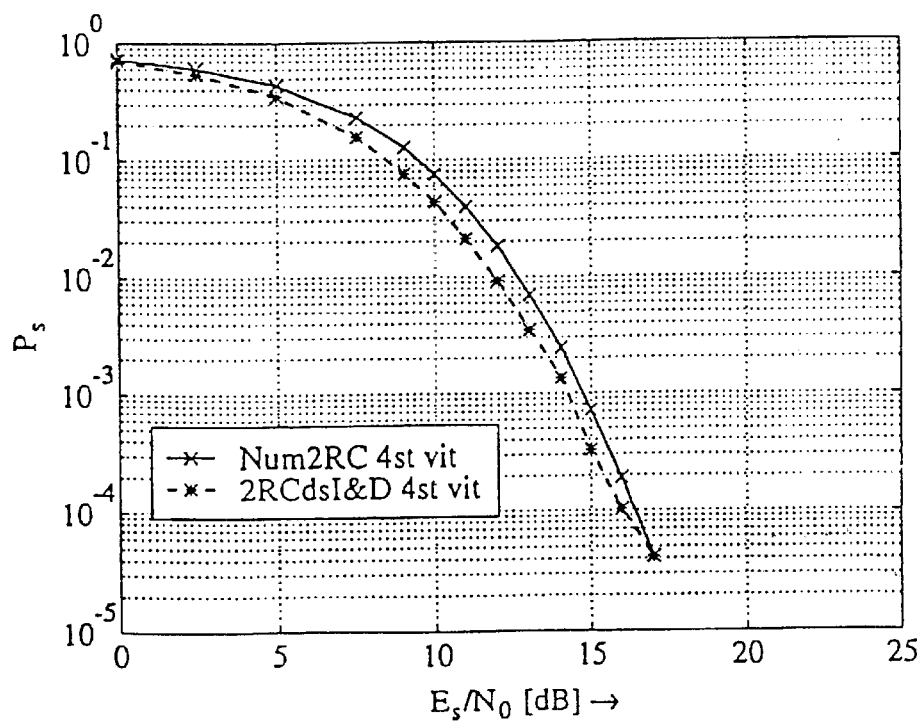
FIG. 9 shows a comparison according to FIG. 8 for the four-step case.

FIGS. 8 and 9 depict a comparison of the exemplary method according to the present invention, having additional Viterbi detection of the received edges, with a classical CPM demodulation method, in which an integration is carried out over a symbol interval (period), i.e., the so-called "Integrate & Dump," to achieve an average of the channel noise, a Viterbi algorithm being additionally used on the detected symbols to identify the most probable symbol sequence and thus to reduce intersymbol interference.

The Figures show that the error rate of the exemplary method according to the present invention is slightly worse both in the two-step as well as in the four-step case. However, in this context, it should be noted that in the two-step case according to FIG. 8, the computing effort comes to only one half, whereas in the four-step case, according to FIG. 9, only one quarter of the computing effort is required.

Therefore, especially in the four-step case, it is possible to design receivers using an exemplary method according to the present invention, which are produced on the basis of significantly lower hardware costs and which are therefore more cost-effective to manufacture.

What is claimed is:

1. A method for demodulating a carrier wave, the carrier wave being subject to modulation using a digital symbol sequence and being transmittable over a noise-impacted channel, the method comprising the steps of:

storing ideal edge shapes of possible transitions between two digital symbols in a memory as reference edges;

receiving and scanning an edge using a scanning frequency, the scanning frequency being a multiple of a frequency of the digital symbol sequence, and providing a received and scanned edge;

detecting the received and scanned edge by using all scanning values for calculating Euclidean distances from at least two of the reference edges; and selecting one of the at least two of the reference edges associated with a lowest one of the Euclidean distances.

2. The method of claim 1, further comprising the step of performing a Viterbi algorithm on a number of sequential edges, wherein the Euclidean distances for the received and scanned edge received in one symbol period and the reference edges are considered costs of one trellis branch of the Viterbi algorithm.

3. The method of claim 1, wherein the reference edges are described by a total of $nM^2$ stored values for the scanning frequency being n/T and a signal step-quantity of M.

4. The method of claim 1, wherein the modulation includes a continuous phase modulation.

5. The method of claim 3, wherein the modulation includes a numerical formation of a derivation and of a phase of one cosine signal corresponding to 2RC-CPM extending over two symbol periods.

6. The method of claim 1, wherein a trellis depth of the Viterbi algorithm corresponds to a signal step-quantity of M.

* * * * *